United States Patent
Bakshi

(10) Patent No.: US 8,733,439 B1
(45) Date of Patent: May 27, 2014

(54) METHOD OF GAS AND OIL PRODUCTION FROM SHALE, OIL SANDS AND BIOMASS USING PROPPANTS AND WELL SAFETY OPTIONS

(71) Applicant: Amarjit Singh Bakshi, Katy, TX (US)

(72) Inventor: Amarjit Singh Bakshi, Katy, TX (US)

(73) Assignee: Amarjit Singh Bakshi, Katy, TX (US)

( * ) Notice: Subject to any disclaimer, the term of this patent is extended or adjusted under 35 U.S.C. 154(b) by 0 days.

(21) Appl. No.: 13/687,378

(22) Filed: Nov. 28, 2012

(51) Int. Cl.
E21B 43/26 (2006.01)
E21B 43/247 (2006.01)

(52) U.S. Cl.
USPC ................. 166/272.2; 166/303; 166/271

(58) Field of Classification Search
USPC ........... 166/303, 372.1, 272.2, 271, 300, 302, 166/272.1
See application file for complete search history.

(56) References Cited

U.S. PATENT DOCUMENTS

| | | | | | |
|---|---|---|---|---|---|
| 6,502,633 | B2 * | 1/2003 | Cooper et al. | ............. | 210/747.8 |
| 7,980,312 | B1 * | 7/2011 | Hill et al. | ............. | 166/303 |
| 8,312,924 | B2 * | 11/2012 | Smith | ............. | 166/259 |
| 2009/0308613 | A1 * | 12/2009 | Smith | ............. | 166/305.1 |
| 2010/0326657 | A1 * | 12/2010 | Hellmann et al. | ............. | 166/280.2 |
| 2012/0285693 | A1 * | 11/2012 | Mirakyan et al. | ............. | 166/308.1 |

* cited by examiner

Primary Examiner — Shane Bomar
Assistant Examiner — Catherine Loikith

(57) ABSTRACT

Methods to recover over 95 percent of oil and gas from shale fracturing, oil sands, biomass, and hydrates and from deep water wells. Employing $CO_2$, $H_2O_2$, some proprietary chemicals, metals and proppants, raising the temperature of the mixture and using the mixture in shale fracturing, oil sands, biomass and gas hydrates to dislodge the gas and oil. Additionally, safety devices capable of pressure reduction at the reservoir in the production well bore upstream of a BOP are included. No water is used and no waste water is produced.

2 Claims, 2 Drawing Sheets

CO₂, H₂O₂ for Gas/oil production from Shale fracking/Oil Sands/Hydrates

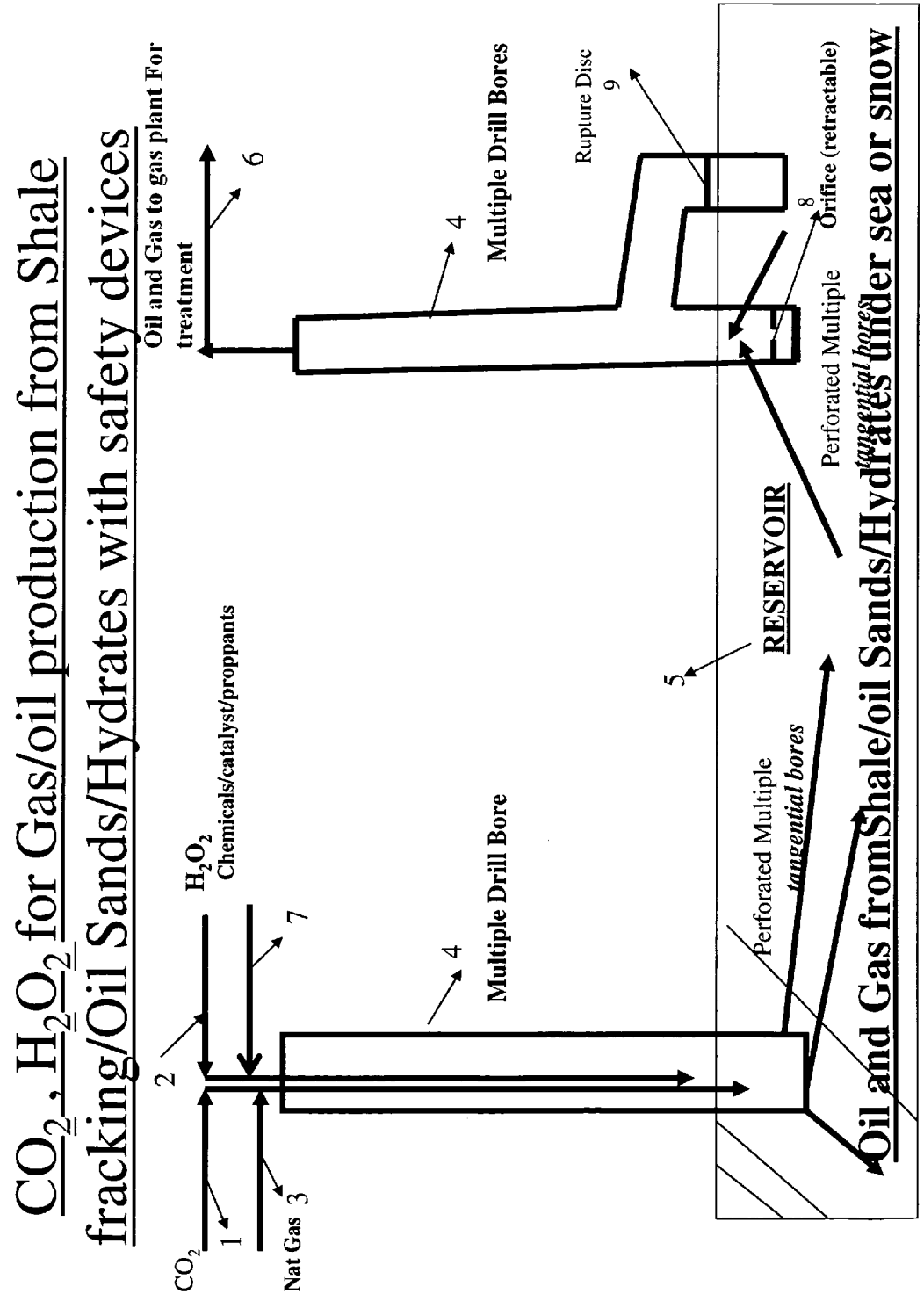

METHOD OF GAS AND OIL PRODUCTION FROM SHALE, OIL SANDS AND BIOMASS USING PROPPANTS AND WELL SAFETY OPTIONS

FIELD OF THE INVENTION

This invention covers the shale/oil sands/biomass and teaches the art of fracturing shale in situ and getting the gas and heavy crude and oil sands, biomass using classic heavy oil production through EOR process with $CO_2$ but with enhancement using oxidizing agent $H_2O_2$ and/or catalyst containing Fe, Co, Ni or similar compounds, acids and inorganic compounds are added to the $CO_2$. The Oxidizing agent $H_2O_2$ provides energy for dissociation by oxidizing $CO_2$, additionally use proppants so the cracks formed in shale can be kept open so that all the gas and oil flows out. For the operation to be successful heating the stream with burning $CH_4$ to moderate to medium temperatures is required. The major paradigm shift is using vapor phase EOR operation which uses $CO_2$, $H_2O_2$ together with/without some catalyst like metals and acids (as mentioned above) and using materials which will work better or equally good as proppants and are available as waste rather than making special proppants at higher cost. The application teaches that rather than expensive way to harden the proppants, using materials available in the industry as waste like fly ash, and waste from mining marble/granite/slate and similar products including clinker from cement industry which is sintered calcium carbonate. The mixture of $CO_2$, $H_2O_2$ and/or catalyst containing Fe, Co, Ni and acids, stream is heated to moderate temperature with methane burning and proppants are added as mentioned (Fly Ash, Marble/granite/clinker crushed to required size), which is at the lower pressure than the process being used at present in the industry and required temperature makes the sedimentary and other type of formations to crack and release oil and gas, where proppants will go in and keep the pores/cracks open so that all oil and gas can be extracted. This lower pressure, new concept provides lower cost proppants, provides paradigm shift to enhancing the art to deliver gas and oil at lower cost at higher yield without creating any waste and using water which is a precious commodity.

The present invention application moves away from the sand and sintered sand specially made proppants which are expensive, and chemicals and about 92% water at pretty high pressures which needs special pumps and equipment which is expensive. Specialty made proppants from polymer coatings and others are expensive, when one can have all these materials which will work better or equally good as proppants (which are essentially waste and are available to use from other processes) like fly ash (though is used in cement making), and mining waste from small pieces of marble/granite and clinker from cement production where calcium carbonate is sintered to lime which has value as cement product but other items listed above are just about waste from coal and coke burning processes or from mining waste products are much cheaper than tailor made proppants, together with high pressure and special equipment is expensive and provides alternate to the existing process as described below in the application.

Additionally this application provides, alternative to the present process used for shale fracking which uses water, proppants (sand/synthetic polymeric substances) and chemicals which though being used with all conviction but there are potential of chemicals going into water table and to water aquifers and any water from process if it is let it go to rivers, Bayou, Sewage system or into sea which will be major environmental disaster no doubt we have had many disasters due to bad design which was acceptable to Client few decades ago and then Clients taking short cuts in maintenance and could have avoided by proper all round design and operation/maintenance practices.

Another disclosure in this application is to use $CO_2$ from power plants or refineries for enhanced oil recovery (EOR) and is used in gas and oil recovery/production from shale, oil sands, and biomass with hydrogen peroxide (which breaks up in water and hydrogen) and at moderate temperature with methane burning and adding proppants. This process dislodges the oil and gas from shale, oil sands, and biomass in situ. The $CO_2$ which is green house gas, with the chemicals or inorganic/or other catalyst used has a potential to break up the $CO_2$ molecule into carbon, CO, hydrogen and water and hence there is no detrimental effect to the environment or water table or rivers/sea water, and most of the other products of reaction like CO or carbon can produce additional energy and proppants addition mentioned in this application are made specially proppants keeps the oil and gas cracks open and flowing. The chemical and catalysts used essentially reduces the $CO_2$, and its effect on the atmosphere so the greenhouse gases are reduced providing additional advantage, FIG. 1 provides the major art of fracturing the shale, Sand, Biomass with $CO_2$ and producing gas and oil without causing environmental problems due to water with chemical being released in water table, aquifers, rivers and sea water with a vertical well and horizontal well perforated for gases to fracture the rock formation. The producing well has vertical and horizontal section with perforations to take of the product as shown in the both figure.

Another claim in this application teaches art of reducing the pressure in oil or gas well with an retractable orifice together with an parallel well of very small length which has a safety device like rupture disc, which is shown in FIG. 2 so as to make it safer for BOP to work at the well head and it gives additional level of protection and safe operation, but having similar vertical wells and horizontal sections as shown in FIG. 1. This could have helped in some of the earlier disasters where well were not controllable and this is explained in FIG. 2. This is one of the most important arts in this application of the patent as this provides safer oil well operation and should be adopted in Government safety standards to make the well operation safer. This could have helped at BP Macondo explosion and also at Chevron spill in Brazil where something went wrong at a deep-sea oil well operated by Chevron Corporation 230 miles (370 kilometers) northeast of Rio de Janeiro. As a massive drill bit punctured reservoir N560, roughly 3,500 feet beneath the ocean floor, monitors revealed pressure much higher than technicians expected. The next day a routine flyover of the field, called Frade, in the Campos Basin, revealed oil on the water's surface. This device as shown in FIG. 2 would have helped to provide safer operation.

BACKGROUND OF THE INVENTION

The main disclosure here is for in situ oil and gas production from shale, oil sands, biomass or gas hydrates where $CO_2$ is used for EOR medium with purity range of 20 to 99% preferably around 95 to 97%, for oil and gas and fracturing of shale, but hydrogen peroxide and/or catalyst containing Fe, Co, Ni or similar compounds is added to the $CO_2$ so as to provide energy for dissociation of $CO_2$. The $CO_2$ can be heated before injection or in situ with natural gas ignited in the pipe separately after addition of hydrogen peroxide, Fe, Cu, Ni or any other catalyst has been mixed with $CO_2$ before injecting in the shale/oil sands/biomass or gas hydrates either in drill oil well bores or under snow/and deep water under ocean, which when injected dislodges the gas from shale/oil sands/biomass, gas hydrates or deep water well bores. This injection of $CO_2$ together with above mentioned chemicals which will not be toxic and will not affect the water contamination. The injection is done underneath at the location at multiple places by horizontal drilling with vertical well so as to provide much more area and is able to provide much higher efficiency and recovery of gas and oil. Another down hole bore with multiple horizontal bores and take of multiple places is able to collect most of the gas and oil and comes out through this down hole production hole. Most of the $CO_2$ is absorbed and stays in shale/oil sands/biomass/under snow structures/and at sea surface below. Some of it breaks up and stays on the shale/and other surfaces but some of the breaks up products come through the production take off down hole. These gas and oil products are sent for treatment to remove the impurities and purification and upgrading. $CO_2$ is injected at a rate of 0.24 BCFD per 30,000 BPOD produced. Addition of $H_2O_2$ and Chemicals and $CH_4$ to raise the temperature is described below. The hydrogen peroxide purity could be 3% to 98%, preferably 30-35 percent and is added into $CO_2$ stream as a 0.1 percent to 70 percent but preferably 1 to 5 percent in $CO_2$. The metals mentioned above which are non-toxic as oxides are injected into $CO_2$ the amount being 0.1 to 50% preferably 0.5 to 5.0% together with proppants in the range of 0.1 to 25% preferably 0.5% to 5.0%. This art provides the possibility of dislodging the natural gas from Shale/biomass and gas hydrates and reduce greenhouse gases which are going to stay in the reservoir and also breakup into carbon and oxygen reducing atmospheric pollution.

The main art described to use EOR by using $CO_2$, proprietary art which adds hydrogen peroxide, chemicals/metals and proppants as mentioned above after raising temperature and at moderate pressure sent to the well through down hole drilling into a reservoir and dislodge and fracture shale, oil sands/biomass or gas hydrates for producing oil or gas. This art is unique and the proprietary art of addition of hydrogen peroxide, chemicals/metals and proprietary proppants as mentioned in this application which are fly ash/waste from marble and granite at elevated does not in any way effect the environment and on the other hand one can reduce the green house problem by leaving the $CO_2$ in the reservoir or break up into coke, and oxygen and hydrogen and other products, which will be useful in energy business and fractures the shale by expansion and dislodge hydrocarbons/gas which will be coming out from the production well.

The second art is of providing well safety with retractable orifice in the well before the production is started as one does not have definite information on pressure so the orifice reduces the pressure in the production well and onto BOP. If pressure in production goes above certain safety limit the parallel well small section provides bypass of the orifice, and in bypass line the rupture Disc safety device provides additional safety equipment before it goes to the BOP as normally is provided but orifice and rupture disc are shown in the production well in FIG. 2.

SUMMARY OF THE INVENTION

The process in this art claims and discloses paradigm shift from normal SAGD, CHOPS, CSS and other oil and gas production processes used application for shale fracturing/oil sands/biomass. The present technologies being used for Shale fracking and Oil Sands use lot of water, and chemicals which are used to extract oil and gas from oil sand, shale fracking. These processes use and produce lot of water and wastewater and effluents have chemicals which pollutes the aquifers, water table and rivers and also sea when discharged into these locations. The chemicals used in the process have potential to get into water table and water aquifers. The art disclosed in the present application provides major advantages by essentially eliminating environmental problems and the facilities will have much lower cost of operation and also reduced capital cost. The extraction of oil and gas provides paradigm shift disclosed in this art essentially reduce any environmental problems due to on site operation and application to recover synthetic crude oil or gas from heavy crude This operation is done by using some fuel gas at the start up but then gas from the operation under controlled conditions provides the conditions which are in the range of 200 to 2000 F, preferably 300 to 600 F temperature and pressure of 5 to 3000 psig preferably in the range of 5 to 1500/2000 psig. This operating range provides the extraction of oil and gas from shale/oil sands/biomass easy to handle as it does not produce waste water, additionally does not use water which is the present day technology trend in this application and the art avoids potential pollution problems which are being debated and some countries are concerned about the water table and aquifers pollution.

The above embodiment disclosed in this application is to fracture shale/Oil Sands/Biomass/hydrates and get the oil and gas by drilling into a reservoir of these formations where $CO_2$ is injected in the well at about 0.24 BCFD per 30000 BPD of oil and mixed with hydrogen peroxide in the concentration recommended above or any of metals like nickel oxide, iron oxide, titanium oxide and similar metals and proppants, and the temperature of injection gas $CO_2$ is raised by controlled natural gas burning, which dislodges the gas and oil from shale, oil sands, biomass/hydrates. The down hole is in the reservoir where it is projected into the angular hole which is mentioned as tangential drill holes, and all these can be multiple to make the effect much more than one down hole. With the elevated temperature and $CO_2$ and other components like proppants and metal oxides and hydrogen peroxide there is a potential of breaking up of $CO_2$ molecule into carbon and hydrogen or keeping the $CO_2$ in the reservoir and displacing the natural gas and oil. So the technique provides two benefits:

First advantage is to get the oil and gas dislodged and is taken out through other multiple holes from the reservoir enhancing the yield, and also keeping the $CO_2$ and elements of broken $CO_2$ molecule in the reservoir. This helps the green house gases to be reduced in the atmosphere which is supposed to be one of the major man made gas which effects the earth's warming as greenhouse effect on the planet earth. In this operation again the conditions in down hole well are 100 to 3000 psig and temperature 200 to 2000 F. Preferably the pressure is around 200 to 1500/2000 psig and temperature is 300 to 600 F at the down hole bottom where temperature is raised with fuel gas and the chemicals to provide shale fracturing/oil sands and biomass which produces oil and gas from these moderate conditions. The second advantage is to have no pollution effluents are being produced in the process. Additionally most important advantage is that it does not use water which is going to be precious commodity nor produces any liquid/waste water and has to be cleaned or can pollute other areas.

Another claim in this application teaches art of reducing the pressure in the oil or gas production well with an retractable orifice together with a parallel well of very small length, which has a safety device like rupture disc, which is shown in FIG. 2 so as to make it safer for BOP to work at the well head and it gives additional level of protection and safe operation, providing three fold safety protection. This could have helped in some of the earlier disasters where well were not controllable and this is explained in FIG. 2. This is one of the most important art of in this application of this patent as this provides safer oil well operation and should be adopted in Government safety standards to make the well operation safer. This could have helped at BP Macondo explosion and also at Chevron spill at Brazil where something went wrong at a deep-sea oil well operated by Chevron Corporation 230 miles (370 kilometers) northeast of Rio de Janeiro.

BRIEF DESCRIPTION OF THE FIGURES

FIG. 2 is a simplified flow diagram of the embodiment for providing retractable orifice and rupture disc in the parallel well leg so as to reduce the pressure on to the BOP at well head and provide safer operation. This is one of most important art used which might provide safer well operation at the start up and during the Oil and gas production phase. Two major paradigm shifts production of oil and gas with enhanced process development to the classical EOR which has major improvements, together with safety devices is a major advancement in the oil and gas production technologies which provides double safety devices upstream of BOP. These new proppants, $H_2O_2$ and heated $CO_2$ provides a new art which enhances the technology without producing waste and using precious commodity water and safer operation a paradigm shift which department of interior should include in safe operation of Oil and gas production wells.

DETAILED DESCRIPTION OF THE INVENTION

Figure 1:
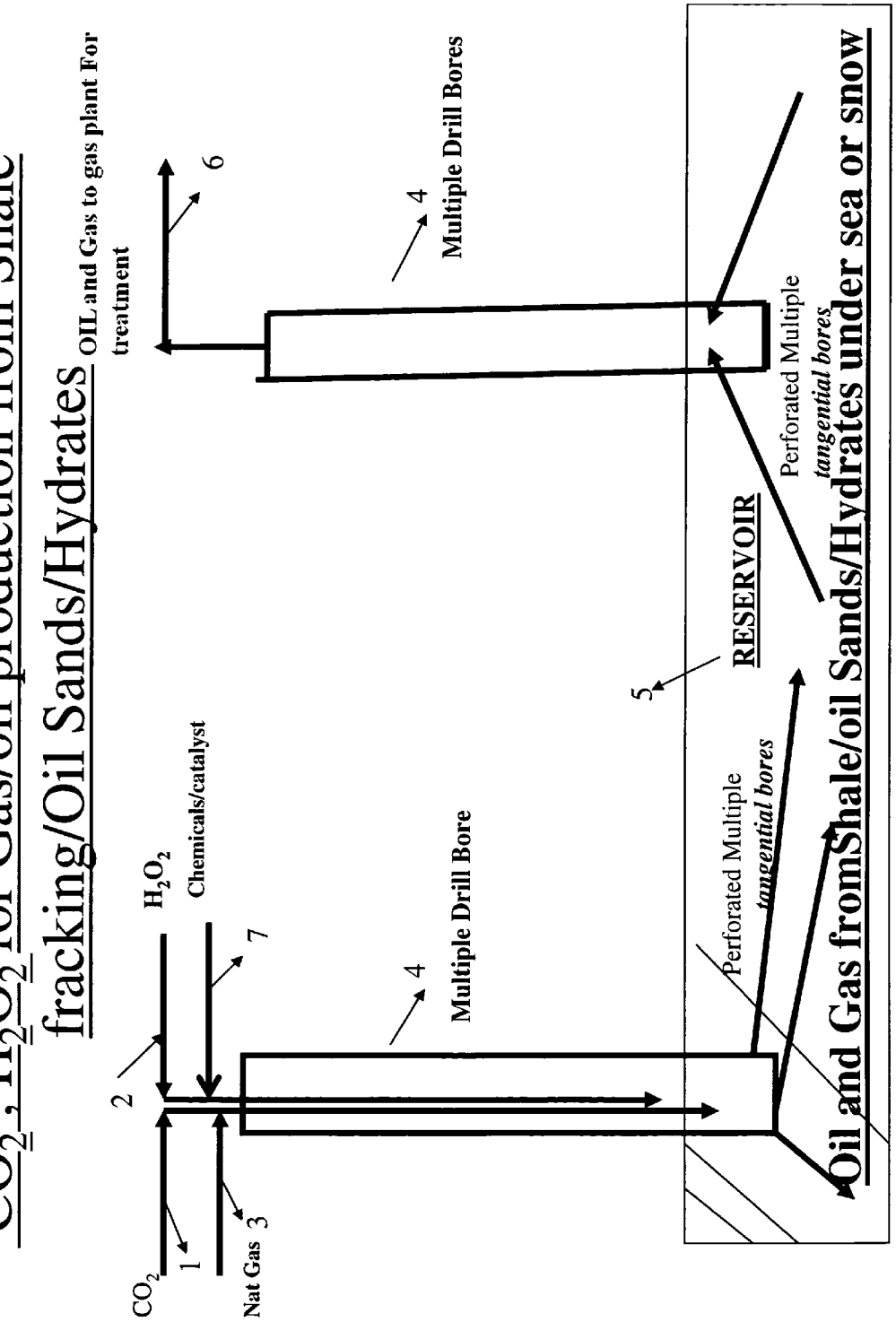
FIG. 1 is a simplified flow diagram of a main embodiment of the present invention. Which is the production of Oil and gas from shale fracking/oil sands/biomass and Hydrates using a new art of using hydrogen peroxide at moderately elevated temperatures and pressure together with waste proppants.

The embodiment of FIG. 1 teaches the art of in situ fracturing/fracking the shale, and extracting the oil and gas and also from oil sands and gas hydrates. The figure shows drill bore(s) as item 4. The $CO_2$ stream 1 from power plants and other sources is pumped into drill down hole. Stream 2 of hydrogen peroxide and stream 7 of metal oxides like iron oxide, nickel oxide etc. is mixed with stream 3, natural gas is added and ignited under controlled conditions to raise the temperature, which allows the shale fracturing and allows the gas and oil to be dislodged from the shale, oil sands and hydrates. Item 5 is shown as reservoir where there are angular drill hole are made from the main drill bore so as to get the much more area where stream 1, 2 and 3 is allowed to provide fracking at slightly elevated temperatures and gas and oil in the reservoir is taken out through production well. The oil and gas produced in the reservoir is pushed through the multiple outlet drill bores item 4 which have also angular branches to get the products. The products are taken as stream 6 and which is sent to gas and oil treatment/cleaning and upgrading and after that gas can be sent to gas plant to recover gas and liquids. This provides an easier and more environmentally friendly application for shale fracturing/oil sands, gas and oil extraction process. The other major benefit is that $CO_2$ which is pumped down in the reservoir it stays there and there is good potential of breaking up of $CO_2$ and make carbon, hydrogen without making any environmentally unfriendly compounds. Additionally one has got rid of so much of greenhouses gases that one is trying to capture and reduce at the moment.

The FIG. 2 describes the essentially same operation except safe operation of all the oil wells for Shale fracking/oil sands/biomass or normal on land oil wells or deep water wells. This provides the retracting orifice item 8, and in the bypass leg of the well rupture disc item 9 so as to reduce the pressure of the production well and provides safer and controlled operation upstream of the BOP and the oil production facilities. Another claim in this application teaches art of reducing the pressure in oil or gas production well with an retractable orifice item 8 together with a parallel production well of very small length and is connected to main production well, and has a safety device like rupture disc in this small length of parallel well, which is shown in FIG. 2 so as to make it safer for BOP to work at the production well head and it gives additional level of protection and safe operation. This could have helped in some of the earlier high pressure oil well production disasters where well were not controllable and this is explained in FIG. 2. This is one of the most important arts in this embodiment of the patent as this provides safer oil well operation and should be adopted in Government safety standards to make the well operation safer. This could have helped at BP Macondo explosion and also at Chevron spill at Brazil whereas pressure was too high and when the well into the reservoir at a deep-sea oil well operated by Chevron Corp. 230 miles (370 kilometers) northeast of Rio de Janeiro.

The embodiment of this application discloses the process of in situ operation for shale fracturing, oil sands and gas hydrates and extraction and maximizing the recovery of oil and gas from the oil wells. The process describes that $CO_2$ is injected down the reservoir and is mixed with one of the following compounds or in some mixture of these, the compounds being hydrogen peroxide, acids, iron oxide, copper oxide and nickel oxide and raising the temperature to 300 to 600 F at 200 to 2000 psig range or higher as mentioned above in the limits of the operation. This extracts the 85 to 95 percent of gas and oil in these reservoirs of shale formation, oil sands and hydrates, and this will provide major indigenous energy from the North Americas and other oil and gas producing locations in worldwide.

The claims in the invention in the embodiment of this patent are:

1. A process for in situ fracturing of shale formations of all types including extraction of oil and gas from oil sand, extraction of oil and gas from biomass and extraction of gas from hydrates, comprising:
   (a) injecting $CO_2$ and $H_2O_2$ containing a catalyst comprising Fe, Co or Ni into said formation at an elevated temperature together with proppants through injection wells to fracture the shale and dislodging the oil and gas from oil sands, biomass and hydrates to produce hydrocarbon liquids and gases;
   (b) recovering produced hydrocarbon liquids and gases through production wells;
   (c) heating the $CO_2$ and $H_2O_2$ to provide energy to break the $CO_2$ molecule and to thermally fracture the shale;
   (d) providing the production wells with safety devices;
   (e) providing a main production well with a retractable orifice plate to avoid excess pressure upstream of a blowout preventer (BOP), thereby avoiding possible unsafe situations;
   (f) providing a small parallel well connected with the main production well and providing a second safety device in the small parallel well, wherein the second safety device is a rupture disc which provides a second form of safety devices upstream of the BOP; and (g) treating the produced oil and gas to remove impurities, wherein the purified gas and liquid is sent to storage.

2. The process according to claim 1 for oil and gas production by shale fracturing oil sands, biomass and gas hydrates comprising:

(a) injecting $CO_2$ with $H_2O_2$ in the injection wells, wherein $CO_2$ is injected within 30% of 0.24 BCFD for 30,000 BPD of oil produced;

(b) adding metal oxides and waste proppants comprising marble, slate, fly ash or granite, crushed to a predetermined screen level at a moderately elevated temperature of 300 to 600° F. and a pressure of 500 to 2000 psig, wherein the proppants are waste and are not specially made;

(c) breaking up some of the $CO_2$ and most of the $CO_2$ stays in the reservoir; and (d) removing said hydrocarbon products through the production wells for treatment, cleaning and upgrading, wherein an oxidizing agent and chemicals/catalyst are fed with $CO_2$ into a top of the wells at which point the oxidizing agent and chemicals are heated by burning $CH_4$ which directly heats a $CO_2$ stream flow, wherein thermal expansion causes fracturing of the shale formation and dislodging of oil and gas from the formation into the reservoir and into the production wells through multiple horizontal and main vertical production wells.

* * * * *